United States Patent

[11] 3,589,576

[72] Inventors James L. Rinkle
2104 North Mueller, Bethany, Okla. 73008;
Sonnie D. Stapleton, P. O. Box 94181, Del City, Okla. 73109
[21] Appl. No. 873,919
[22] Filed Nov. 4, 1969
[45] Patented June 29, 1971

[54] CONVERTIBLE RACK FOR VEHICLE
8 Claims, 7 Drawing Figs.
[52] U.S. Cl................................................ 224/42.01,
224/42.1 E, 296/3, 296/108
[51] Int. Cl................................................ B60r 9/00
[50] Field of Search.......................................... 224/29,
42.1 E; 296/3, 100, 10, 99, 105, 108; 224/42.01

[56] References Cited
UNITED STATES PATENTS
2,947,566 8/1960 Tower........................... 296/10
3,458,094 7/1969 Wallace........................ 224/42.1 EX Primary Examiner—Robert G. Sheridan
Attorneys—William D. Hall, Elliott I. Pollock, Fred C. Philpitt, George VandeSande, Charels F. Steininger and Robert R. Priddy ABSTRACT: A supporting rack adapted to be secured to the load-carrying portion of a truck body. A pivotally attached portion is adapted to overlie the main portion of the rack, and in such position is provided with a configuration for supporting a tarpaulin or the like. The pivotally secured portion is also adapted to be rotated to a nonoverlying position in which such portion provides an extension of the top framework of the rack so as to provide an elongated support for carrying lengthy loads. A tailgate portion of the rack is also adapted to be secured to the main framework in either of two positions which are the inverse of each other. In one position of the tailgate portion an additional support for the tarpaulin is provided, whereas in the inverted position, an additional extended support is provided for long loads.

PATENTED JUN29 1971 3,589,576

INVENTORS
James L. Rinkle
Sonnie D. Stapleton

BY Robert G. Priddy
ATTORNEY

INVENTORS
James L. Rinkle
Sonnie D. Stapleton

BY Robert G. Priddy

ATTORNEY

PATENTED JUN29 1971 3,589,576
SHEET 3 OF 3
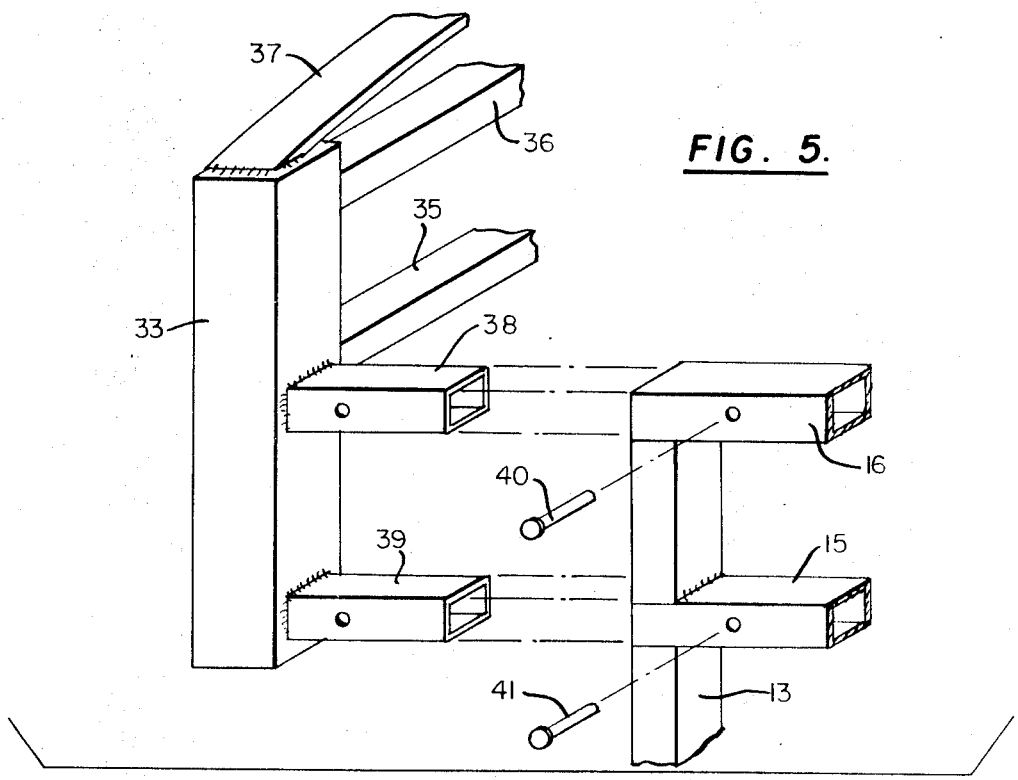
FIG. 5.
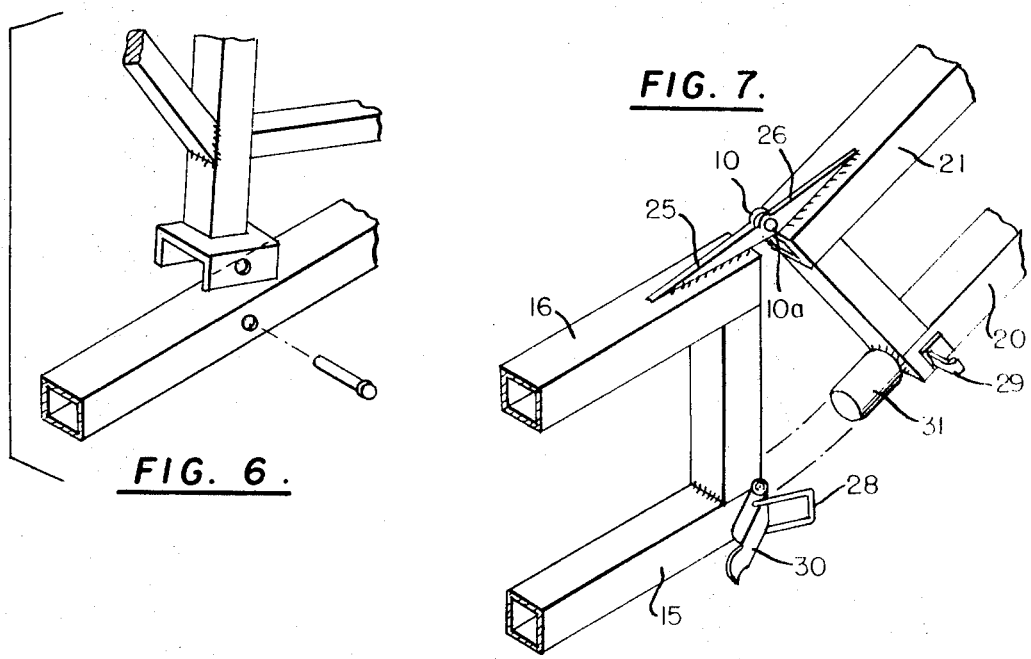
FIG. 6.
FIG. 7.
INVENTORS
James L. Rinkle
Sonnie D. Stapleton
BY 
ATTORNEY

CONVERTIBLE RACK FOR VEHICLE

BACKGROUND OF THE INVENTION

Metal framework structures which are adapted to be attached to the load-carrying body portion of a truck, such as a pickup truck, are well known in the art. The object of such devices is to enable the pickup truck to be readily converted to carry a particular kind of materials or to adapt the truck for supporting an enclosed structure in which a load may be carried that is protected from the elements. In the latter configuration, the vehicle may be quite readily used as a camper.

Although such structures are well known, the prior art does not include structures which are readily capable of performing both functions. In other words, the prior art does not include a device which may be attached to a truck body and which is readily convertible in its configuration, being capable of functioning to carry long loads and, in another configuration, serving as an enclosed vehicle or camper, and with the organization of the structure being such that conversion between the two loads can very quickly and conveniently be undertaken without requiring special tools and without requiring that portions of the apparatus be removed and stored in one or the other of its different configurations.

SUMMARY OF THE INVENTION

The present invention comprises a tubular structure which is adapted to be readily secured to a truck body, especially a pickup truck. The structure is formed of tubular metal, preferably of rectangular or square cross section provided with vertical cornerposts each of which is adapted to fit into a corresponding socket on the truck body. The structure comprises, essentially, two portions which are hingedly connected together and which, for convenience, are hereinafter termed a main portion and an auxiliary portion. The auxiliary portion is pivotally secured to the main portion along a horizontal axis at the top, forward edge of the main portion. The auxiliary portion, in one configuration of the apparatus, is folded back and on top of the main portion, and in this position it provides a properly contoured support for a tarpaulin or the like which may be fitted over the entire structure and thus provide an enclosed interior space for hauling loads which are protected from the elements, or for serving as a camper, or the like.

The pivotally secured portion may also be rotated about its horizontal pivot so as to lie generally parallel to and generally in the same plane as the upper surface of the main structure, and in this position, the overall configuration is such as to provide an elongated support for carrying long loads such as timber, poles, pipes, etc. In the latter configuration, a tailgate portion of the main body portion is adapted to be removed and inverted in position so as to provide a transverse support which is generally coplanar with that provided by the more forward crossmembers of the pivotally secured portion, thereby providing additional support for the elongate members carried by the structure.

BRIEF DESCRIPTION OF THE DRAWINGS

In the drawings:

FIG. 1 illustrates the structure of the present invention with the auxiliary portion folded back and on top of the main portion so as to provide a contoured support for a tarpaulin or the like;

FIGS. 4 and 5 comprise detail views showing the manner in which the tailgate portion may be readily secured to and removed from the main portion and may be also installed in either of two positions depending upon the desired use of the apparatus;

FIG. 6 is a detail view illustrating the locking means for securing the auxiliary portion and the main portion together when the two are in the relative positions shown in FIG. 1; and FIG. 7 is a detail view illustrating the locking means for securing the auxiliary portion to the main portion when the two are in the relative positions shown in FIG. 2.

DETAILED DESCRIPTION OF THE PREFERRED EMBODIMENT

Figure 1:
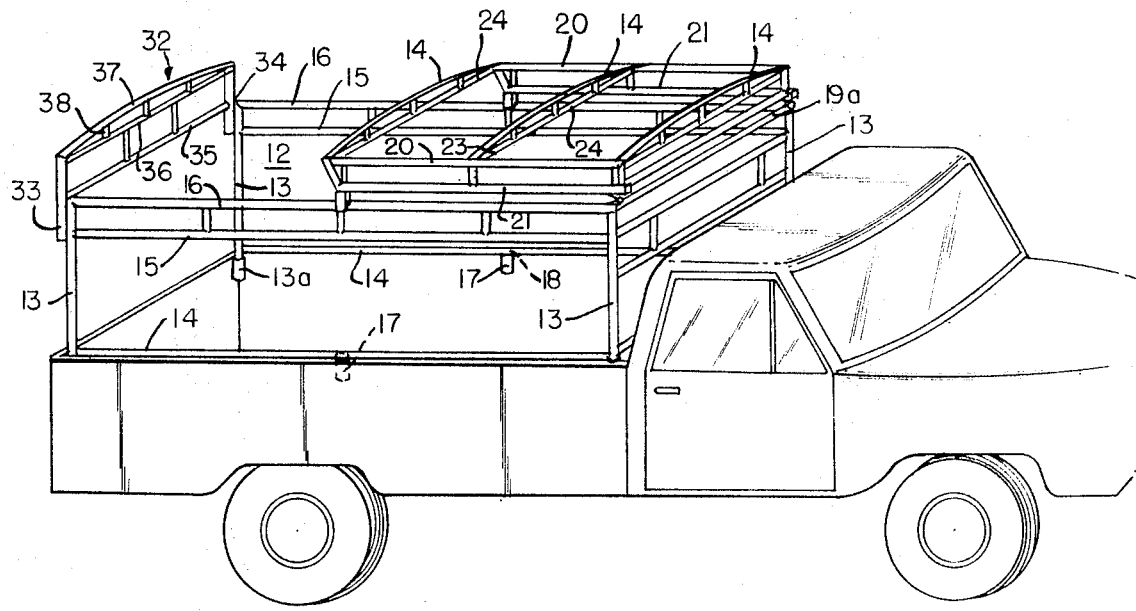
Figure 2:
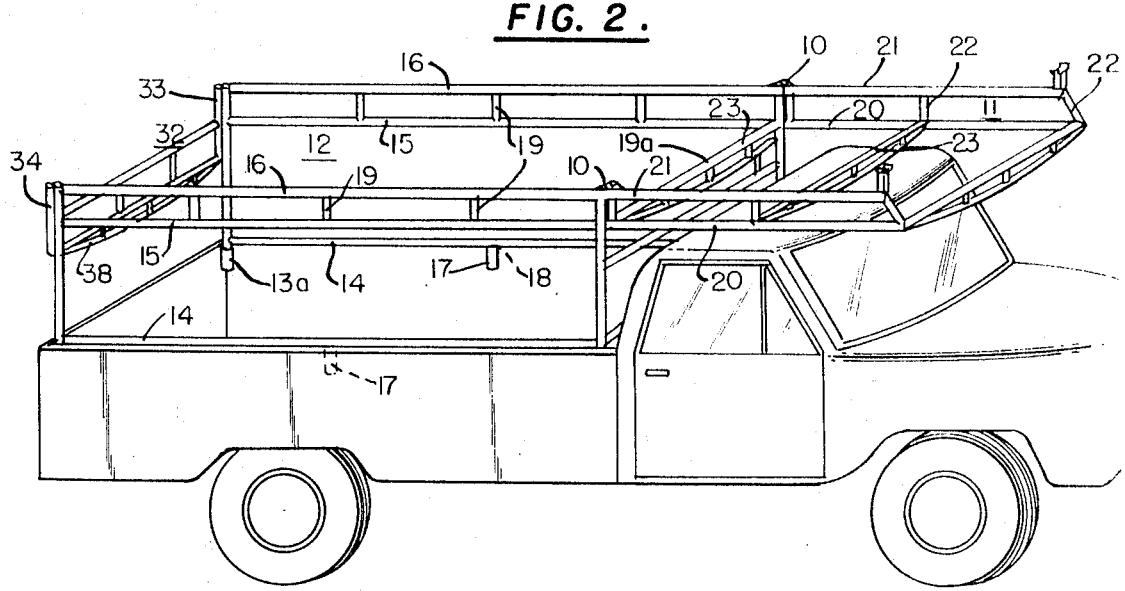
FIG. 2 comprises a view of the apparatus of FIG. 1 with the auxiliary portion revolved in a forward direction so as not to overlie the main portion but rather to provide a forward extension thereof for carrying elongate loads.

FIGS. 1 and 2 illustrate the structure of the present invention as applied to a vehicle such as a pickup truck. In FIG. 2, the main portion comprises the portion extending to the left-hand side of the pivotal supports 10, and the auxiliary portion comprises the structural members to the right of this same support. In FIG. 2, the auxiliary portion is swung outwardly and ahead of the main portion about the hinges 10 and it can be seen that, in this position, the auxiliary portion 11 comprises an elongate extension of the main portion 12. In FIG. 1, on the other hand, the auxiliary portion 11 is rotated backwardly about its hinges 10 so as to overlie the upper, forward portion of the main body 12, and in this position it will be noted that the auxiliary portion includes contoured elements 14 which are of such a shape as to provide a curved support for a tarpaulin or the like which may be secured about the overall structure and thus provide a substantially entirely closed body portion for use as a camper or for carrying loads which are desired to be protected from the elements.

Referring again to FIGS. 1 and 2, it can be seen that the main portion 12 comprises four upright posts 13 which are adapted to have their lower ends fit into corresponding sockets 13a which are normally provided in the load-carrying body portion of a pickup truck. Longitudinally extending lower 14 and upper 15 and 16 members on each side of the structure interconnect the rear and forward vertical posts 13. Most pickup truck bodies are provided with additional intermediate sockets 17, and thus the lower longitudinal rails 14 may, if desired, be provided with downwardly extending short tubular portions 18 which can fit into these intermediate sockets 17.

The upper longitudinal rails 16, one on each side of the vehicle, may be welded to the fore and aft vertical posts 13. Preferably, short vertical rail portions 19 are provided at spaced intervals between the longitudinal rails 15 and 16 on each side of the truck to provide additional stiffness. At the forward end of main portion 12, a transverse member 19a joins the forward vertical posts 13 at the height of the longitudinal members 14.

The auxiliary portion comprises, as is also shown in FIGS. 1 and 2, two longitudinally extending parallel rail members 20 and 21 on each side, with such members being joined together for stiffness by short, vertical crosspieces 22. Referring to FIG. 1, the upper longitudinal rails 20 are interconnected at their midlength and also at the end remote from the hinges 10 by crossmembers 23; however, no crossmembers are provided between the two lower (in FIG. 1) longitudinal members 21 for purposes which will readily become apparent.

Figure 3:
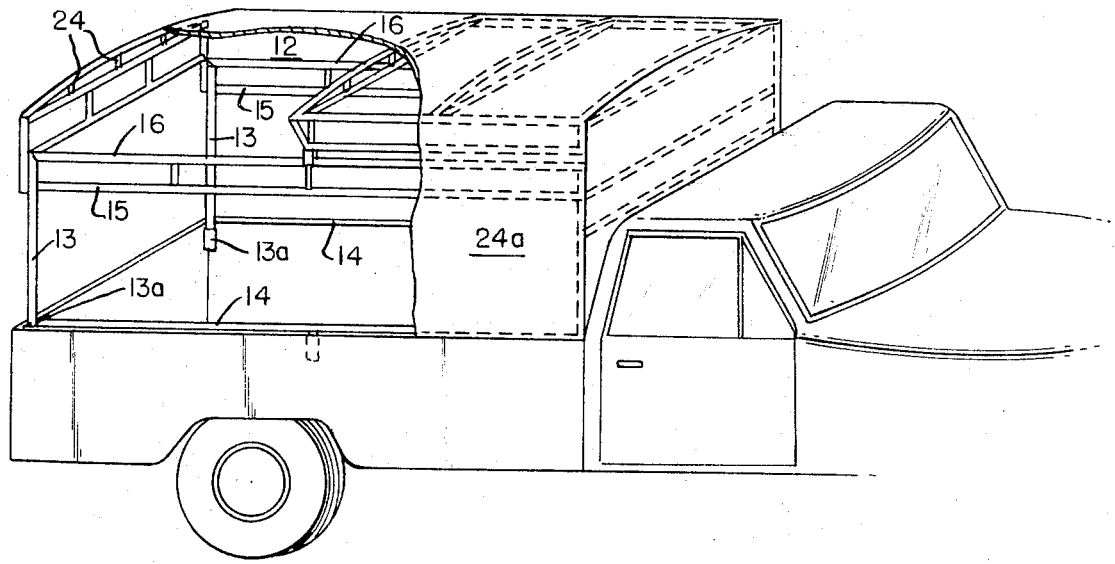
FIG. 3 is a view showing the apparatus in the configuration of FIG. 1 but showing a tarpaulin in place over the rack.
Figure 4:
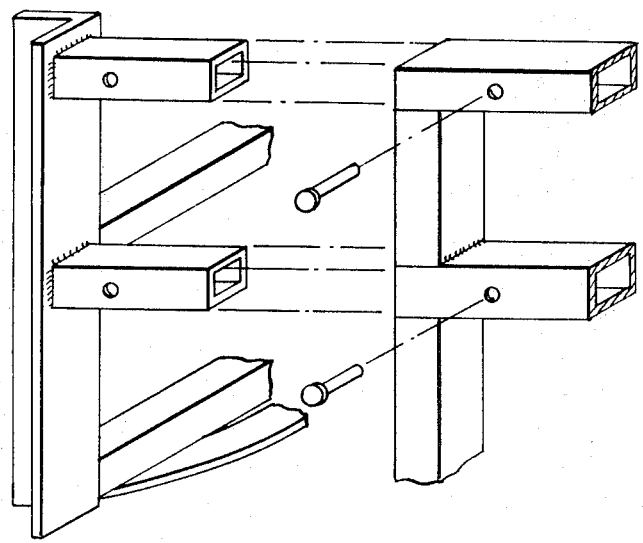

In addition, the two longitudinal members 20 are joined by curved crossmembers 14 (see FIG. 1) whose proper curvature relative to the straight crossmember 23 is maintained by means of vertical spacing members 24 (see FIG. 3) which are selected to be of appropriate length across the length of crossmember 23 so as to provide a desired curvature for member 14. It will be apparent that with the auxiliary portion overlying the main portion as shown in FIG. 1, curved members 14 provide a suitable support for a tarpaulin 24a or the like, as shown in FIG. 3, with the curvature ensuring that rainwater falling upon the tarpaulin will readily run off the sides and not collect at the top.

As shown in FIG. 2, the auxiliary portion may readily be pivoted outwardly about hinges 10 so as to provide an elongation of the upper part of the main body portion. Each hinge 10, as can be seen in FIG. 7, is formed by providing two web portions 25 and 26, each of which is welded to a respective one of the frame members 16 and 21 and with a suitable hinge pin 10a passing through mating apertures in these two web portions.

When the auxiliary portion 11 is rotated outwardly about its pivot, it is of course desirable that it be locked in this extended position so that bouncing of the vehicle will not cause the auxiliary portion to rotate intermittently about its pivot. To accomplish this, a locking mechanism is provided which comprises a hasp 28 secured to member 15 which fits over a hook 29 welded to longitudinal member 20 and with the hasp being provided with a toggle mechanism 30 whereby the members 15 and 20 may be tightly drawn together. For extra rigidity of the structure in this position, it will be noted that a dog 31 is welded to longitudinal member 20 and is adapted to fit into the open end of the longitudinal member 15.

In the position of the apparatus shown in FIG. 2, support for long loads such as lumber and pipes, etc. is provided entirely by the crossmembers 19a and 23, the crossmember 19a being a portion of the main portion whereas the members 23 form a portion of the auxiliary portion. However, with the auxiliary portion rotated forwardly about its hinges 10, it will be noted that all three crossmembers lie in the same plane so as to provide a single plane of support for any load carried by the vehicle.

It will be noted, by comparing FIGS. 1 and 2, that the tailgate portion 32 may be secured to the main body part in either of two ways; first of all, it should be noted, from FIG. 1, that the tailgate portions comprise two short vertical members 33 and 34, which are joined by transverse members 35 and 36 and also by a curved member 37 whose appropriate curvature is ensured by means of the vertically extending members 38 which are disposed at intervals along the length of member 36 and are secured to both that member and to the curved member 37.

Referring to FIG. 5, it will be noted that there are two horizontally extending dogs 38 and 39 which are secured to vertical members 33, and a similar pair of dogs is secured to member 34 as well. The dogs 38 and 39 are adapted to fit into respective apertures comprising the interior portions of the two longitudinal members 15 and 16 on each side. When the tailgate portion is installed in place, these two dogs 38 and 39 are inserted into their respective apertures, and pins 40 and 41 are then passed through mating apertures in the assembled combination so as to hold the two together.

When the vehicle is intended to be used as shown in FIG. 1, the tailgate portion 32 is installed with the curved portion 37 uppermost so that again a rounded surface is provided for the tarpaulin. However, if the vehicle is intended for carrying long loads as in FIG. 2, then it is preferable to invert the position of the tailgate portion 32 in which event the transverse member 35 provides a support, at the rear of the vehicle, for any long load being carried; and it will be noted that this transverse member lies generally in the same plane as the transverse members 19a and 23 at the forward end of the structure.

It will be noted that the apparatus can very readily be installed on a pickup truck, and is very conveniently capable of being adapted to either type of use. No special tools are required, either to install it or to convert it from the use of FIG. 1 to that of FIG. 2.

What we claim is:

1. A convertible rack for a pickup truck body of the type having vertically disposed sockets at least at its corners where an end wall joins a sidewall, said rack being convertible between a first condition where it is adapted for supporting a tarpaulin and a second condition when it is adapted for carrying elongate loads, said rack comprising in combination, a main portion having cornerposts each disposed at a corner of said body and disposed at their lower ends into said sockets, longitudinal side members joining said cornerposts on each side of said body and transverse members also joining said cornerposts at each end of said body, an auxiliary portion comprising at least four cornerposts having a length substantially less than that of said cornerposts of said main portion and being joined by longitudinal and transverse members whose lengths are such that said auxiliary portion has a width substantially equal to that of said main portion but a length less than that of said main portion, and hinge means for hingedly connecting said auxiliary portion to said main portion along the forward, upper edge of said main portion, said hinge means permitting rotation of said auxiliary portion from a first position in which said auxiliary portion overlies said main portion to a second position in which said auxiliary portion extends forwardly of said main portion to provide an extended support for the carrying of elongate loads.

2. The apparatus of claim 1 in which said transverse members of said main portion are disposed below the upper ends of said cornerposts and have their upper surfaces lying in a common plane, said transverse members of said auxiliary portion being disposed to lie also in said common plane when said auxiliary member is rotated forwardly about said hinge means, whereby elongate loads supported by said transverse members on said common plane are prevented from rolling off the side of said rack by, at least in part, said cornerposts which extend above said plane.

3. The apparatus of claim 2 in which said transverse member at the rear end of said main portion is detachably secured adjacent the rear cornerposts of said main portion and comprises at least two spaced structural members interconnected by a plurality of vertical supports, said rear transverse member being adapted for securing adjacent said rear cornerposts in a first position in which the uppermost of said structural members forms a convex curved upper support for a tarpaulin and in an optional second position in which the then uppermost structural member provides a flat support lying in said common plane.

4. The apparatus of claim 3 in which said longitudinal side members of said main portion comprise hollow tubular members, and said rear transverse member includes a plurality of horizontally extending dogs which fit into the ends of said tubular side members.

5. The apparatus of claim 1 which further includes means for locking said auxiliary portion in both said first and second positions.

6. The apparatus as defined by claim 1 in which said auxiliary portion includes also at least one generally curved transverse element extending at its convex apex above the uppermost ends of said cornerposts to thereby provide a support for a tarpaulin.

7. The apparatus as claimed in claim 1 in which said main portion comprises two longitudinally extending parallel members interconnecting the front and rear cornerposts on each side, the topmost of said two members interconnecting said cornerposts substantially at their uppermost ends and the other interconnecting said cornerposts at locations spaced from but generally adjacent to said uppermost ends, said auxiliary portion in its forwardly extended position also comprising two parallel longitudinally extending parallel members the lower one of which is so disposed as to be substantially colinear with the lower of the two parallel members of said main portion, said transverse members on both said main and auxiliary portions interconnecting only the lower of said parallel members to provide thereby a plurality of longitudinally spaced transverse supports for an elongate load, which supports all lie in a common plane.

8. The apparatus of claim 7 in which said auxiliary portion supports a pair of longitudinally extending dogs each substantially colinear with a respective lower one of said two parallel longitudinal members, a socket on the end of each said lower longitudinal member on said main portion for receiving a respective one of said dogs when said auxiliary portion is rotated about said hinge means to its forwardly extended position, and means for locking each said dog in its respective socket.

UNITED STATES PATENT OFFICE
CERTIFICATE OF CORRECTION

Patent No. 3,589,576          Dated June 29, 1971

Inventor(s)    James L. Rinkle et al.

It is certified that error appears in the above-identified patent and that said Letters Patent are hereby corrected as shown below:

Cancel columns 3 and 4 of the printed patent and substitute the attached columns 3 and 4.

Signed and sealed this 9th day of April 1974.

(SEAL)
Attest:

EDWARD M. FLETCHER, JR.        C. MARSHALL DANN
Attesting Officer              Commissioner of Patents

FORM PO-1050 (10-69)